(12) United States Patent
Ohama et al.

(10) Patent No.: US 7,978,380 B2
(45) Date of Patent: Jul. 12, 2011

(54) IMAGE READER AND METHOD OF PRODUCING THEREOF

(75) Inventors: Takashi Ohama, Iwakura (JP); Yoshinori Osakabe, Seto (JP); Takahiro Ikeno, Owariasahi (JP); Akihiro Sakakibara, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1266 days.

(21) Appl. No.: 11/476,932

(22) Filed: Jun. 29, 2006

(65) Prior Publication Data

US 2007/0002398 A1    Jan. 4, 2007

(30) Foreign Application Priority Data

Jun. 30, 2005    (JP) .................................. 2005-191545

(51) Int. Cl.
*H04N 1/04* (2006.01)
*H04N 1/21* (2006.01)
*H04N 1/23* (2006.01)

(52) U.S. Cl. ....................................... 358/494; 358/296

(58) Field of Classification Search .................. 358/1.9, 358/300, 471, 474, 493, 497, 500, 504, 505, 358/296, 494; 382/126, 321
See application file for complete search history.

(56) References Cited

U.S. PATENT DOCUMENTS

| 4,980,759 | A | * | 12/1990 | Smyth | ........................... 358/500 |
| 5,038,028 | A | * | 8/1991 | Boyd et al. | ................ 250/208.1 |
| 6,717,702 | B1 | | 4/2004 | Yamauchi et al. | |
| 6,903,849 | B2 | | 6/2005 | Yokota | |
| 2003/0021496 | A1 | * | 1/2003 | Sugimoto | ..................... 382/321 |
| 2003/0137700 | A1 | * | 7/2003 | Kelsay | ........................ 358/300 |

FOREIGN PATENT DOCUMENTS

| JP | 200177983 | 3/2001 |
| JP | 2001346006 | 12/2001 |

* cited by examiner

*Primary Examiner* — James A Thompson
(74) *Attorney, Agent, or Firm* — Baker Botts L.L.P.

(57) ABSTRACT

An image reader has an image sensor; a carriage; a positioning portion formed at a predetermined position in a longitudinal direction of the image sensor with respect to a reference position of the image sensor; a connector portion to which an electric cable is connected and which is provided between an end of the carriage and one end in the longitudinal direction of a case of the image sensor; and an engaging portion formed in the carriage. In the image recording apparatus, since the positioning portion is engaged with the engaging portion, it is possible to use a common carriage for a plurality of types of image sensors, and an operation of connecting the electric cable becomes simple.

15 Claims, 16 Drawing Sheets

IMAGE READER AND METHOD OF PRODUCING THEREOF

CROSS-REFERENCE TO RELATED APPLICATIONS

The present application claims priority from Japanese Patent Application No. 2005-191545, filed on Jun. 30, 2005, the disclosure of which is incorporated herein by reference in its entirety.

BACKGROUND OF THE INVENTION

1. Field of the Invention

The present invention relates to an image reader in which an image sensor, which irradiates light on a recording-objective medium (reading-objective medium), photoelectrically converts reflected light from the recording-objective medium and outputs the reflected light to a control unit, is mounted on a carriage, and the carriage is reciprocated by a scanning mechanism in parallel to a surface for placing a recording-objective medium, and to a method of producing the image reader.

2. Description Of The Related Art

As disclosed in U.S. Pat. No. 6,903,849 (corresponding to Japanese Patent Application Laid-open No. 2001-346006) for example, a so-called flat bed scanner, in which an image sensor such as CCD (Charge Coupled Device) or CIS (Contact Image Sensor) provided inside a placing-reading table is mounted on a carriage for reading an image of an original by scanning, is known as an image reader mounted in a copying machine or a multifunction machine.

FIG. 13 is a diagram showing a conventional image sensor and a carriage. As shown in the diagram, an image sensor 90 has a rectangular parallelepiped shape with a longitudinal direction being primary scanning direction (main scanning direction). The image sensor 90 has an upper surface 91, which is a surface for reading an image or a letter. The image sensor 90 is a so-called CIS, in which light is irradiated from a light source provided inside the image sensor 90 to the outside via the upper surface 91, and reflected light from a medium to be read (recording-objective medium) incidents on the image sensor 90 via the upper surface 91. The incident reflected light is collected to a photoelectric conversion element by a lens, thereby outputting an electric signal corresponding to the intensity of the reflected light.

The carriage 92 is for holding the image sensor 90. As shown in the diagram, the carriage 92 is a container having an open upper side and capable of enclosing the image sensor 90. The image sensor 90 is accommodated in the carriage 92 to be enclosed therein, and is positioned in a primary scanning direction and a secondary scanning direction by engagement structures having projection and recess shapes for example, which are formed appropriately on the image sensor 90 and the carriage 92.

The carriage 92 is arranged to be reciprocapable along a guide shaft of a scanning mechanism by engaging with the guide shaft. Further, the carriage 92 is coupled to a timing belt of the scanning mechanism and reciprocates by receiving drive transmission via the timing belt. An engaging portion with the guide shaft and a coupling portion to the timing belt are formed on a bottom surface of the carriage 92. Further, to the image sensor 90, an electric cable for outputting an electrical signal and supplying power to the light source and so forth is connected. A connector portion to be connected to the electric cable is provided on a bottom surface of the image sensor 90. The electric cable connected to the connector portion is drawn inside a space between the image sensor 90 and the carriage 92 and extended from a predetermined position on the carriage 92 to the outside of the carriage 92.

The image sensor 90 performs reading of an image of a recording-objective medium with its longitudinal direction being the primary scanning direction and a direction orthogonal to the primary scanning direction being the secondary scanning direction. Therefore, the length in the longitudinal direction of the image sensor 90 corresponds to the width of a recording-objective medium of the maximum readable size, and inside the image sensor 90, a light source and a photoelectric conversion element which correspond to the width of the recording-objective medium of the maximum size are provided. Therefore, depending on whether the recording-objective medium of the maximum readable size is A4 size or A3 size for example, the length in the longitudinal direction of the image sensor 90 is different. As a matter of course, the image sensor 90 capable of reading a recording-objective medium of the A3 size can read an image of a recording-objective medium of the A4 size, but naturally, the costs thereof increase as the length of the image sensor 90 becomes long. Therefore, using the image sensor 90 corresponding to, for example, the A3 size for all image readers without considering the frequency of usage, users' needs and the like is not appropriate in view of the costs and the size of the apparatus. In short, it is preferable to produce image readers capable of reading up to the A3 size and image readers capable of reading up to the A4 size for example according to respective demands for them.

As the carriage 92 accommodating the image sensor 90, a carriage corresponding to the length of the image sensor 90 is designed. Specifically, dedicated carriages 92 according respectively to lengths of the image sensor 90 corresponding to the A3 size and the image sensor 90 corresponding to the A4 size have been used.

Further, to the connector portion provided on the bottom surface of the image sensor 90, the electric cable cannot be connected in a state that the image sensor 90 is accommodated in the carriage 92. Therefore, there is adopted a working method such that after the electric cable is drawn inside the carriage 92 in advance and immediately before the image sensor 90 is engaged with the carriage 92, the electric cable is connected to the connector portion. For example, the image sensor 90 and the carriage 92 are engaged pivotally by a shaft and a bearing, and in this engaging state, after the electric cable is connected to the connector portion, the image sensor 90 is pivoted about the carriage 92 so as to accommodate the image sensor 90 in the carriage 92. In this manner, an operation of keeping the image sensor 90 and the carriage 92 in a predetermined engaging state and further connecting the electric cable is difficult, which often causes a problem that a worker comes in contact with the upper surface 91 of the image sensor 90. The upper surface 91 is an optical path for reading an image of a recording-objective medium, and hence there is a problem if scratching, fogging or the like due to the contact by a worker occurs, a read image by the image sensor 90 deteriorates.

SUMMARY OF THE INVENTION

The present invention is made in view of such problems, and an object thereof is to provide an image reader in which an image sensor is mounted on a carriage and the carriage is reciprocated by a scanning mechanism in parallel to a surface for placing recording-objective medium, and which realizes cost decrease for the carriage and simplifies connection of an electric cable to the image sensor, and to provide a method of producing the same.

According to a first aspect of the present invention, there is provided an image reader, including: an image sensor having an elongated shape; a carriage; a positioning portion formed at a predetermined position in a longitudinal direction of the image sensor with respect to a reference position in a case of the image sensor; a connector portion to which an electric cable is connected and which is provided between an end of the carriage and one end in the longitudinal direction of the image sensor; and an engaging portion formed in the carriage; wherein the positioning portion is engaged with the engaging portion.

In the image sensor according to the present invention, a recording-objective medium of the maximum readable size is determined such as A4 size and A3 size for example. For example, in order for a contact-type image sensor such as a CIS to read an image of a recording-objective medium of a predetermined size, the length in the longitudinal direction of the case of the image sensor is not less than the width of the recording-objective medium. Therefore, an image sensor for which the recording-objective medium of the maximum readable size is the A4 size has a case with a length corresponding to the A4 size, and an image sensor for which the recording-objective medium of the maximum readable size is the A3 size has a case with a length corresponding to the A3 size. Then, the image sensor is moved relative to the recording-objective medium with the longitudinal direction of the case being a primary scanning direction so as to perform reading of an image.

In the image sensor, a positioning portion for positioning the image sensor with respect to the carriage is formed. This positioning portion is formed at a predetermined position with respect to the reference position in the longitudinal direction of the case of the image sensor. In other words, for example, either when the recording-objective medium of the maximum readable size is the A4 size or when it is the A3 size, the positioning portion is at the predetermined position with respect to the reference position in the longitudinal direction of the case of the image sensor. Further in other words, the positioning portion is at a common position for plural types of image sensors which are different in the recording-objective medium of the maximum readable size.

In the image sensor, the connector portion to which an electric cable is connected is provided. The connector portion is arranged between the one end in the longitudinal direction of the image sensor and the end of the carriage. Therefore, attaching of an electric cable or the like to the connector portion becomes simple. The electric cable is, for example, for outputting output signals to a control unit from the image sensor and inputting control signals from the control unit to the image sensor.

In the carriage, the engaging portion for engaging with the positioning portion of the image sensor is formed. Since the positioning portion of the image sensor is at the common position for plural types of image sensors, the engaging portion is formed at a constant position regardless of the type of the image sensor mounted on the carriage, namely the length in the longitudinal direction of the case. Accordingly, the carriage is made common for the plural types of image sensors. By this commonizing of the carriage, it is possible to decrease the costs of the apparatus.

In the image reader according to the present invention, the image sensor may be mounted on the carriage such that the one end to which the connector portion is provided is projected to outside of the carriage. In this manner, when connecting the electric cable to the connector portion, there is no need to remove the image sensor from the carriage. Accordingly, an operation of connecting the electric cable becomes simple, and a possibility of a contact with the upper surface of the image sensor while working is decreased. Further, the carriage is reduced in size, so that the costs of the carriage can be decreased.

In the image reader according to the present invention, the connector portion may be provided in a bottom surface of the image sensor. In this manner, although the bottom surface of the image sensor mounted on the carriage is covered by the carriage, one end of the image sensor is projected from the carriage. Accordingly, the electric cable can be connected to the connector portion in a state that the image sensor is mounted on the carriage.

In the image reader according to the present invention, the image sensor may have a cable holder which holds the electric cable at a predetermined position separated from the connector portion. In this manner, regardless of the position of the connector portion, a position in the primary scanning direction, at which the electric cable is extended from the image sensor, can be set at a desired position.

In the image reader according to the present invention, the cable holder may restrain movement of the electric cable in a longitudinal direction of the electric cable. In this manner, between the connector portion and the cable holder, load in the electric cable can be constant. Further, by loosing the electric cable between the connector portion and the cable holder, no load is transmitted via the electric cable to a connecting position at which the connector portion and the electric cable are connected. Accordingly, even when the electric cable changes in posture along with the reciprocating movement of the carriage, any excessive load will not be generated at the connecting position of the connector portion and the electric cable.

In the image reader according to the present invention, the reference position may be a center in the longitudinal direction of the image sensor. In this case, the reference position can be determined easily.

In the image reader according to the present invention, the positioning portion may include first and second positioning portions, and the first positioning portion may engage with the carriage in an inner surface of the carriage and the second positioning portion may engage with the carriage in an outer surface of the carriage. In this manner, the image sensor can be mounted in the carriage easily.

In the image reader according to the present invention, the engaging portion may include first and second engaging portions, and the first engaging portion may be formed in an inner surface of the carriage and the second engaging portion may be formed in an outer surface of the carriage. In this manner, the image sensor can be mounted easily in the carriage.

According to a second aspect of the present invention, there is provided an image reader, including: an image sensor; a carriage used in common for the image sensor and another image sensor having a size different from that of the image sensor; and an engaging portion which is provided to the image sensor to engage with the carriage, and which is provided at a position same for the image sensor and the another image sensor.

In the present invention, the engaging portion of the image sensor is provided at the position same for the positioning portion of the image sensor and another image sensor having a size different from that of the image sensor, so that each of the image sensor and the another image sensor can be mounted in the common carriage even when the size thereof are different.

In the image reader according to the present invention, the image sensor and the another image sensor having the size different from that of the image sensor may have a common reference position, and the position of the engaging portion may be determined with respect to the reference position. In this manner, the engaging portion can be determined at the same position with respect to the image sensors having different sizes.

In the image reader according to the present invention, the reference position may be a center in a longitudinal direction of the image sensor, and the position of the engaging portion may be a position separated from the reference position by a predetermined distance in the longitudinal direction of the image sensor. In this manner, the reference position and the position of the engaging portion can be determined easily.

In the image reader according to the present invention, a connector portion to which an electric cable is connected may be provided between an end of the carriage and one end in a longitudinal direction of each of the image sensor and the another image sensor having the size different from that of the image sensor. In this manner, the one end of the image sensor is projected from the carriage, so that the electric cable can be connected to the connector portion in a state that the image sensor is mounted on the carriage.

In the image reader according to the present invention, a portion to be engaged (engage-objective portion) which is engaged with the engaging portion may be formed in the carriage.

In the image reader according to the present invention, the engaging portion may include first and second engaging portions, and the first engaging portion may engage with the carriage on an inner surface of the carriage and the second engaging portion may engage with the carriage in an outer surface of the carriage.

In the image reader according to the present invention, the engage-objective portion may include first and second engage-objective portions, and the first engage-objective portion may be formed in an inner surface of the carriage and the second engage-objective portion may be formed in an outer surface of the carriage.

According to a third aspect of the present invention, there is provided a method of producing an image reader, including: providing image sensors which have an elongated shape, which have various lengths, and each of which has an engaging portion formed at a position common for the image sensors having various lengths; providing a carriage which is used in common for the image sensors having various lengths, and which has an engage-objective portion to be engaged with the engaging portion; engaging the engaging portion of one of the image sensors with the engage-objective portion of the carriage so as to mount one of the image sensors in the carriage; and assembling, to a body of the image reader, one of the image sensors mounted in the carriage and other parts.

In the present invention, the engaging portion of each of the image sensors of the various lengths is formed at the position common for the image sensors of various lengths, so that image sensors of various sizes can be mounted in a common carriage having the engaging portion at a corresponding position.

In the method of producing the image reader according to the present invention, a connector may be attached to one of the image sensors such that the connector exists at a position outside the carriage when one of the image sensors is mounted in the carriage. In this case, an operation of attaching the electric cable or the like to the connector becomes easy.

In the method of producing the image reader according to the present invention, the connector may be attached after one of the image sensors has been mounted in the carriage. In this case, the connector can be attached to the image sensor without inattentively touching the image sensor.

In the method of producing the image reader according to the present invention, the connector may be attached before one of the image sensors is mounted in the carriage. In this case, an operation of attaching the connector to the image sensor becomes easy.

PREFERRED EMBODIMENTS FOR CARRYING OUT THE INVENTION

Hereinafter, embodiments of the present invention will be described with reference to the drawings as appropriate.

First Embodiment

Figure 1:
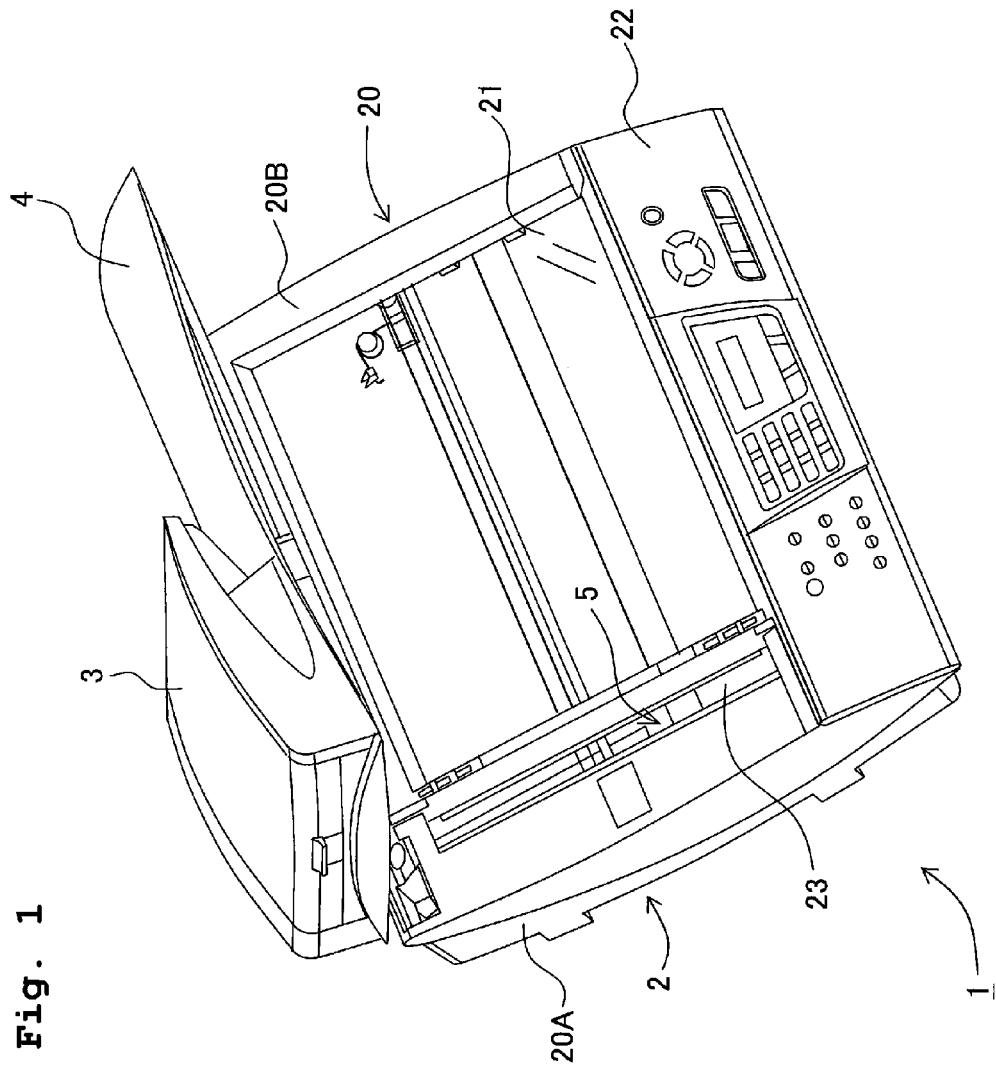
FIG. 1 is a perspective view showing the exterior structure of an image reader 1 according to an embodiment of the present invention.

FIG. 1 is a diagram showing an exterior structure of an image reader 1 according to a first embodiment of the present invention. This image reader 1 is used as, for example, a scanner section of a Multi-Function Device (MFD) which has a printer function and a scanner function integrally, or used as an image reading section of a copy machine, but the printing function or the like is an optional mechanism in the present invention, and thus the image reader 1 may be realized, for example, as a flatbed scanner (FBS) having only the scanner function.

As shown in the diagram, the image reader 1 is constructed such that an original (original document of manuscript) holding cover 4 having an auto document feeder (ADF) 3 is attached in an openable/closable manner to a placing-reading table 2 which functions as the FBS. The placing-reading table 2 is constructed such that a platen glass 21 is disposed on a ceiling surface of a case 20 having a substantially rectangular parallelepiped shape, and an image reading unit 5 is provided inside the case 20. The upper surface of the platen glass 21 is a surface for placing recording-objective medium thereon. Therefore, when the image reader 1 is used as the FBS, an original as a medium to be read (recording-objective medium) is placed on the platen glass 21, an original holding cover 4 is closed to secure the original, and an image of the document is read by scanning with the image reading unit 5.

Further, on a front side of the placing-reading table 2, an operation panel 22 is provided. The operation panel 22 is constructed of various types of operation buttons and a liquid crystal display section, and the image reader 1 operates by instructions given via the operation panel 22. In addition, when the image reader 1 is realized as the MFD, the image reader 1 is connected to a computer and operates also by, besides the instruction from the operation panel 22, instructions transmitted from the computer via a scanner driver or the like.

On the original holding cover 4, an ADF 3 which continuously carries originals from an original tray to a paper discharge tray is provided. An original passes through a platen 23 in a carrying process by the ADF 3, and the image reading unit 5 reads an image of the original at a position below the platen 23. Note that the ADF 3 has an optional construction in the present invention.

Figure 2:
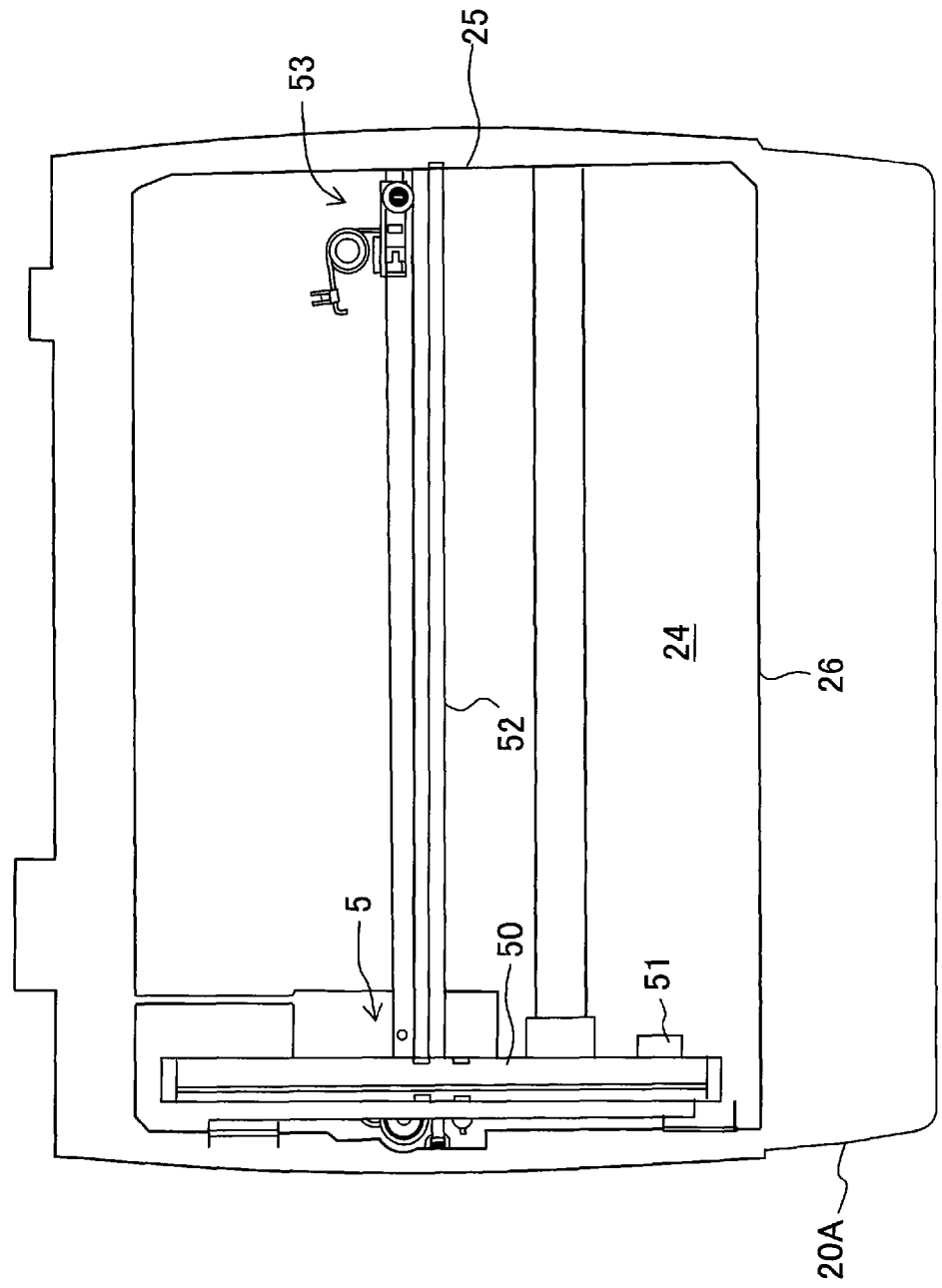
FIG. 2 is a plan view showing the internal structure of a placing-reading table 2.

The case 20 of the placing-reading table 2 is constructed of a lower frame 20A which has a container form and which is open in an upper surface thereof, and an upper cover 20B having an opening formed in the center thereof for exposing the platen glass 21. As shown in FIG. 2, the image reading unit 5 is arranged inside the lower frame 20A. The lower frame 20A and the upper cover 20B are both made of synthetic resin, and the lower frame 20A is formed integrally of a base portion 24 forming a bottom plate, side walls 25 standing from the periphery of the base portion 24, and a partition plate 26 for partitioning a portion at which the image reading unit 5 is arranged and a portion at which a substrate for the operation panel 22 or the like are arranged. Note that in the lower frame 20A, a support rib for supporting the platen glass 21, a boss portion for screwing various types of members, a through hole for an electrical wiring or the like, and so forth are provided further, but since they are designed appropriately depending on an embodiment of the placing-reading table 2, detailed descriptions of which are omitted.

As shown in FIG. 2, the image reading unit 5 is constructed of an image sensor 50, a carriage 51, a guide shaft 52, and a belt drive mechanism 53. The image sensor 50 is a contact-type image sensor which irradiates light on an original as a recording-objective medium, photoelectrically converts reflected light from the original, and outputs an electrical signal, and is generally referred to as CIS. The image sensor 50 has a case 49 mounted on the carriage 51, and performs scanning under the platen glass 21 with a longitudinal direction of the case 49 being a primary scanning direction and a short side direction thereof being a secondary scanning direction. The carriage 51 engages with the guide shaft 52 provided in a width direction of the lower frame 20A, and is driven by the belt drive mechanism 53 to slide and move on the guide shaft 52. By the carriage 51 mounting the image sensor 50 in close contact with the platen glass 21 and moving on the guide shaft 52, the image sensor 50 is reciprocated in parallel to the platen glass 21.

Figure 3:
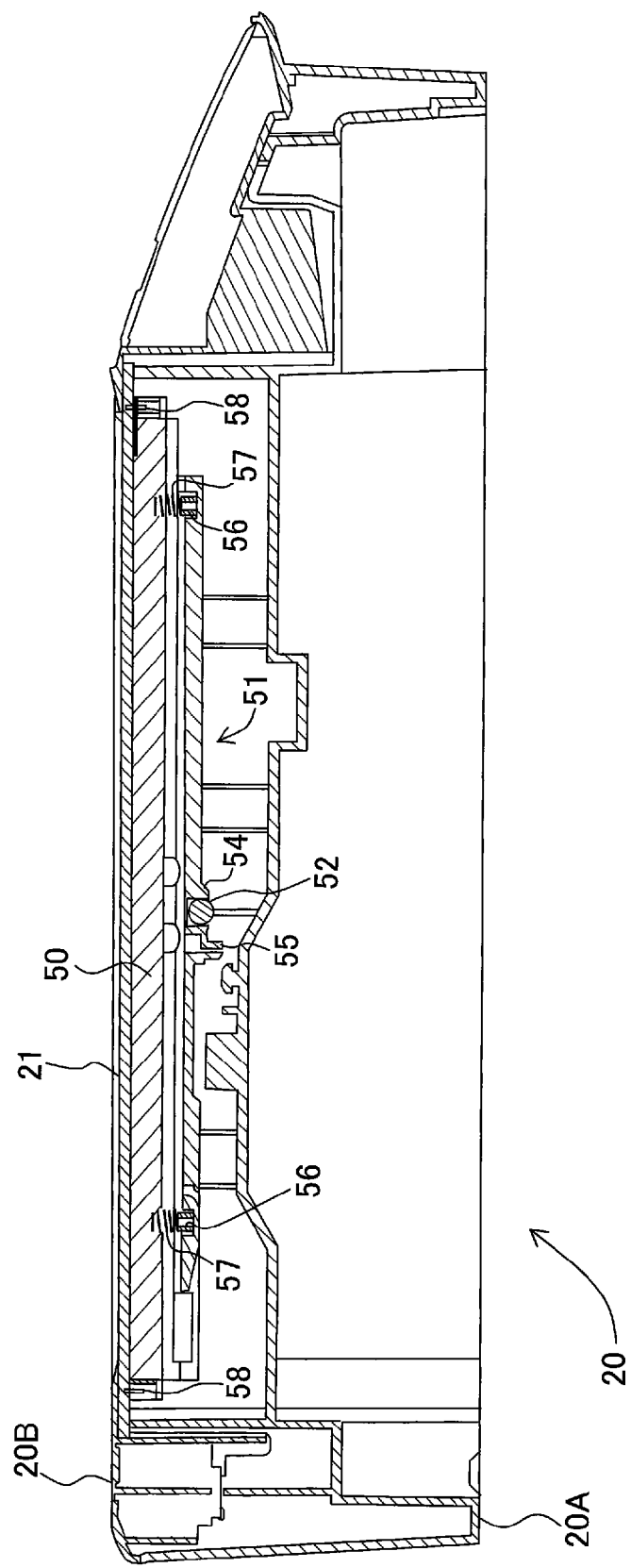
FIG. 3 is a vertical cross-sectional view showing a main structure of the placing-reading table 2.

As shown in FIG. 3, the carriage 51 mounts, on its upper side, the image sensor 50 in a manner to support the image sensor 50 thereon, and on a lower surface of the carriage 51, there is formed a shaft receiving portion 54 which engages with the guide shaft 52 in a manner to straddle thereon from above. The shaft receiving portion 54 and the guide shaft 52 engage with each other, and the carriage 51 is supported by the guide shaft 52 to be slidable in an axial direction of the guide shaft 52. Further, beside the shaft receiving portion 54, a belt holding portion 55 is provided to project downward. The belt holding portion 55 holds a timing belt 61 of the belt drive mechanism 53, which will be described later, to couple the timing belt 61 to the carriage 51. Accordingly, drive force is transmitted from the belt drive mechanism 53 to the carriage 51, and thereby the carriage 51 moves on the guide shaft 52.

Further, inside the carriage 51 in which the image sensor 50 is mounted, spring receiving portions 56 are formed at two positions, namely left and right positions respectively. Coil springs 57 are positioned by the spring receiving portions 56 and interposed between the image sensor 50 and the carriage 51. By these coil springs 57, the image sensor 50 mounted on the carriage 51 closely contacts a lower surface of the platen glass 21 in a pressing manner thereto. Rollers 58 are provided on both ends of the image sensor 50, respectively, and by the rollers 58, the image sensor 50, pressed to the lower surface of the platen glass 21, smoothly moves along with movement of the carriage 51 while closely contacting the lower surface of the platen glass 21.

Figure 4:
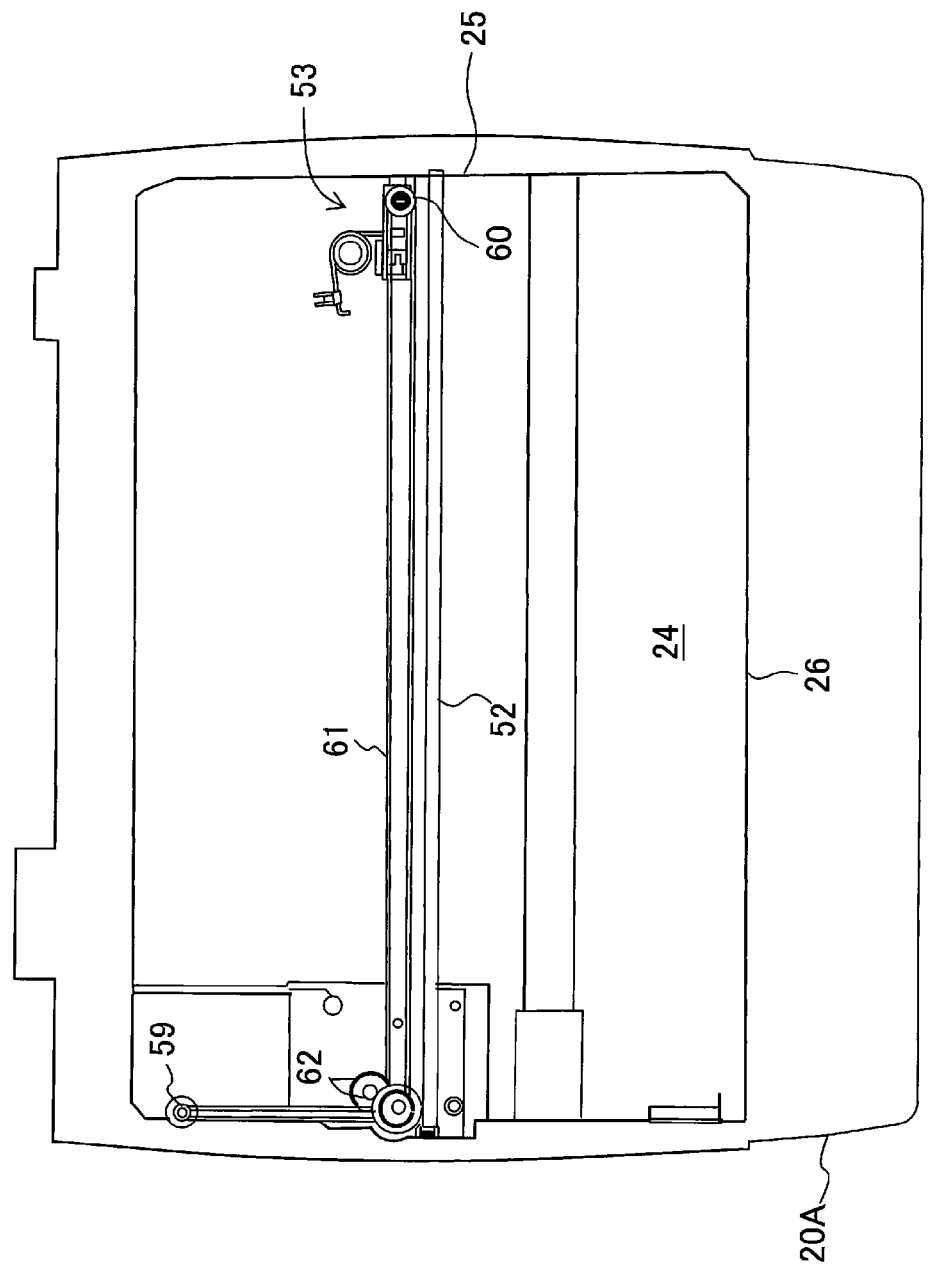
FIG. 4 is a plan view showing the schematic structure of a belt drive mechanism 53.

The belt drive mechanism 53 is constructed such that, as shown in FIG. 4, the timing belt 61 which is an endless belt having tooth formed inside thereof is wound and laid between a drive pulley 59 and a driven pulley 60, rotation of a motor is outputted to the shaft of the drive pulley 59, and rotation of the drive pulley 59 enables peripheral movement of the timing belt 61. As shown in the diagram, the drive pulley 59 is disposed at a far left position in the lower frame 20A, and the timing belt 61 wound around the drive pulley 59 extends to the front surface side of the lower frame 20A and is wound around intermediate pulleys 62 disposed in front of the guide shaft 52 to turn substantially perpendicularly, and extends to a right end of the lower frame 20A along the guide shaft 52 and is wound around the driven pulley 60 disposed in the vicinity of the right end, thereby being arranged in an L-shape. A portion between the driven pulley 60 and the intermediate pulleys 62 of the timing belt 61 arranged in this manner, namely a portion along the guide shaft 52, is held by the belt holding portion 55 of the carriage 51 and thereby the timing belt 61 is coupled to the carriage 51. Note that for the timing belt 61, it is needless to mention that, other than the endless belt, it is possible to use a belt with ends, the both ends of which being fixed to the carriage 51.

Hereinafter, structures of the image sensor 50 and the carriage 51 will be described in detail.

Figure 5:
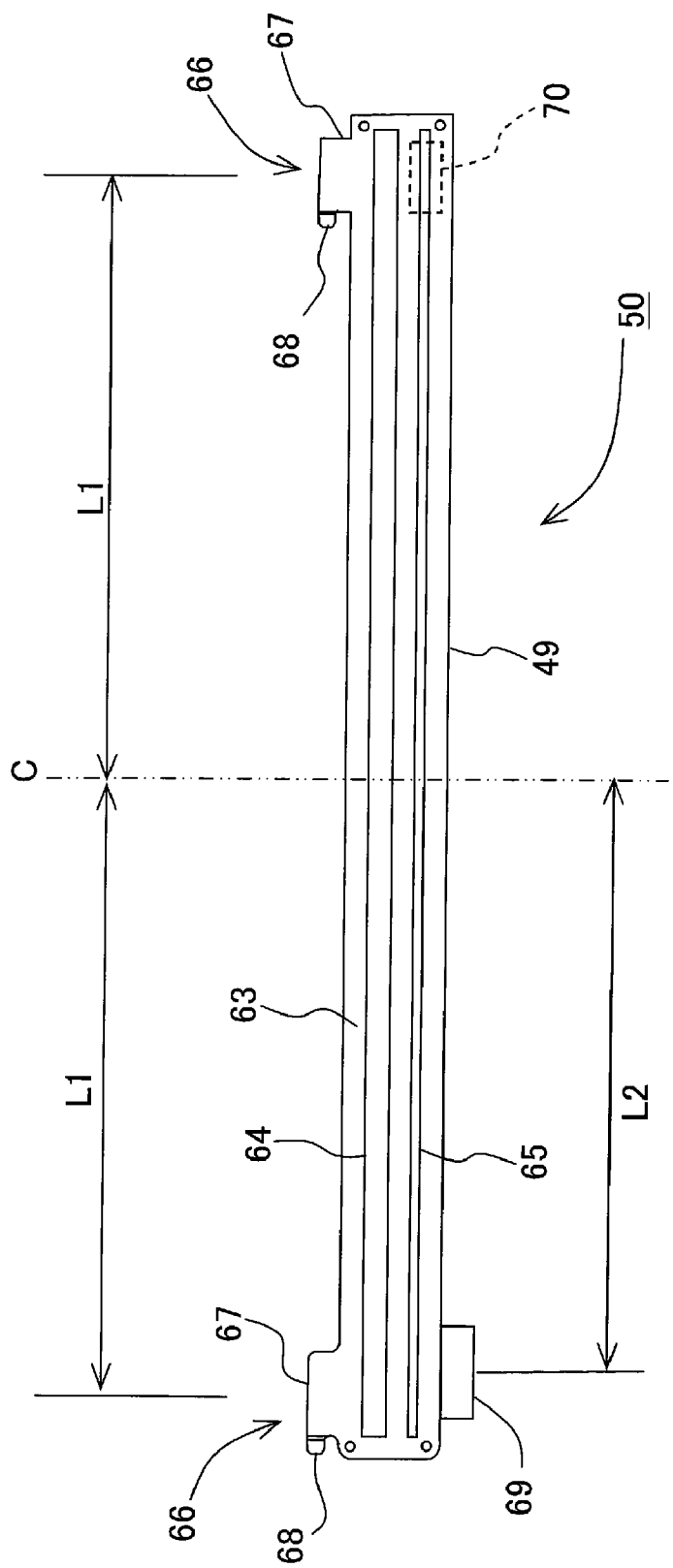
FIG. 5 is a plan view showing the structure of an image sensor 50.

As shown in FIG. 5, the image sensor 50 has the case 49 in a rectangular parallelepiped shape with an upper surface 63 thereof being a slender rectangle in a plan view. On the upper surface 63 of the case 49, a light guide 64 for guiding a light of an LED provided inside the case 49 is arranged in a longitudinal direction of the case 49. By this light guide 64, the light of the LED is projected to a side of the upper surface 63 of the case 49 of the image sensor 50. Further, on the upper surface 63 of the case 49, a lens array 65 constructed of a plurality of condenser lenses is aligned in a row in the longitudinal direction of the case 49 in parallel to the light guide 64. Further, inside the case 49, a plurality of photoelectric conversion elements are aligned in the same direction as the condenser lens array 65 immediately under or below the condenser lens array 65. The light projected from the LED is irradiated on a recording-objective medium, and reflected light therefrom is collected to the photoelectric conversion elements by the condenser lens array 65. The light conversion elements output electrical signals according to the intensity of the reflected light. In this manner, the image sensor 50 outputs an image of the recording-objective medium as electrical signals.

The longitudinal direction of the case 49 of the image sensor 50 is the primary scanning direction for reading an image. The length in this primary scanning direction, namely the length in the longitudinal direction of the case 49 of the image sensor 50, is the length corresponding to a recording-objective medium of the maximum size readable by the image sensor 50. The image sensor 50 has a length corresponding to a recording-objective medium of A4 size.

On the case 49 of the image sensor 50, positioning portions 66 are provided. The positioning portions 66 are for positioning of the image sensor 50 with respect to the carriage 51 in the secondary scanning direction, namely a direction orthogonal to the primary scanning direction. To describe in detail, the positioning portions 66 are formed such that base portions 67 are provided to project from ends on one of sides in the short side direction of the case 49 of the image sensor 50, and shafts 68 are provided to project in the longitudinal direction from the base portions 67, respectively. These shafts 68 engage with shaft receiving portions 73, which will be described later, of the carriage 51, and thus the image sensor 50 is positioned in the secondary scanning direction.

The positioning portions 66 are provided at two positions on one end in the short side direction of the case 49 of the image sensor 50. This pair of the positioning portions 66 are arranged at predetermined positions with respect to a reference position C in the longitudinal direction of the case 49, regardless of the length in the longitudinal direction of the case 49 of the image sensor 50. In other words, in either case of the image sensor 50 corresponding to the A4 size or a later-described image sensor 78 corresponding to A3 size, the positioning portions 66 are arranged at the same positions with respect to the reference position C in the longitudinal direction of the case 49. This reference position C is at the center in the longitudinal direction of the case 49. As shown in the diagram, the positioning portions 66 are arranged in the vicinities of both ends in the longitudinal direction of the case 49 respectively, where a distance L1 separated in the longitudinal direction from the reference position C for the positioning portions 66 is constant regardless of the length in the longitudinal direction of the case 49. Note that although in this embodiment the respective distances L1 from the reference position C for the respective positioning portions 66 are equal, the respective distances L1 for the pair of the positioning portions 66 need not be equal as long as the distances from the reference position C are constant.

Further, on the other side in the short direction of the case 49 of the image sensor 50, a projecting portion 69 (positioning portion) is formed. This projecting portion 69 is for positioning of the image sensor 50 in the primary scanning direction by engaging with a recess 76, which will be described later, of the carriage 51. This projecting portion 69 is arranged also at a predetermined position with respect to the reference position C in the longitudinal direction of the case 49, namely a position separated by a distance L2 in the longitudinal direction of the case 49 from the reference position C, regardless of the length in the longitudinal direction of the case 49 of the image sensor 50.

Further, a connector portion 70 is provided on a bottom surface of the case 49 of the image sensor 50 on one end on a side in the longitudinal direction of the case 49. The connector portion 70 is connected electrically to the LED and the photoelectric conversion elements of the image sensor 50 for performing inputting/outputting of a signal and the like with a control unit. An electric cable 77 is connected to the connector portion 70, and by the electric cable 77, the image sensor 50 and the control unit of the image reader 1 are connected electrically. The control unit of the image reader 1 has, for example, a CPU for performing various arithmetic operations, a ROM storing various types of control programs, a RAM for temporarily storing data, and an ASIC for driving a drive circuit, various interfaces or the like, and so forth. By the electric cable 77, an electric signal path is formed between the image sensor 50 and the control unit.

Figure 6:
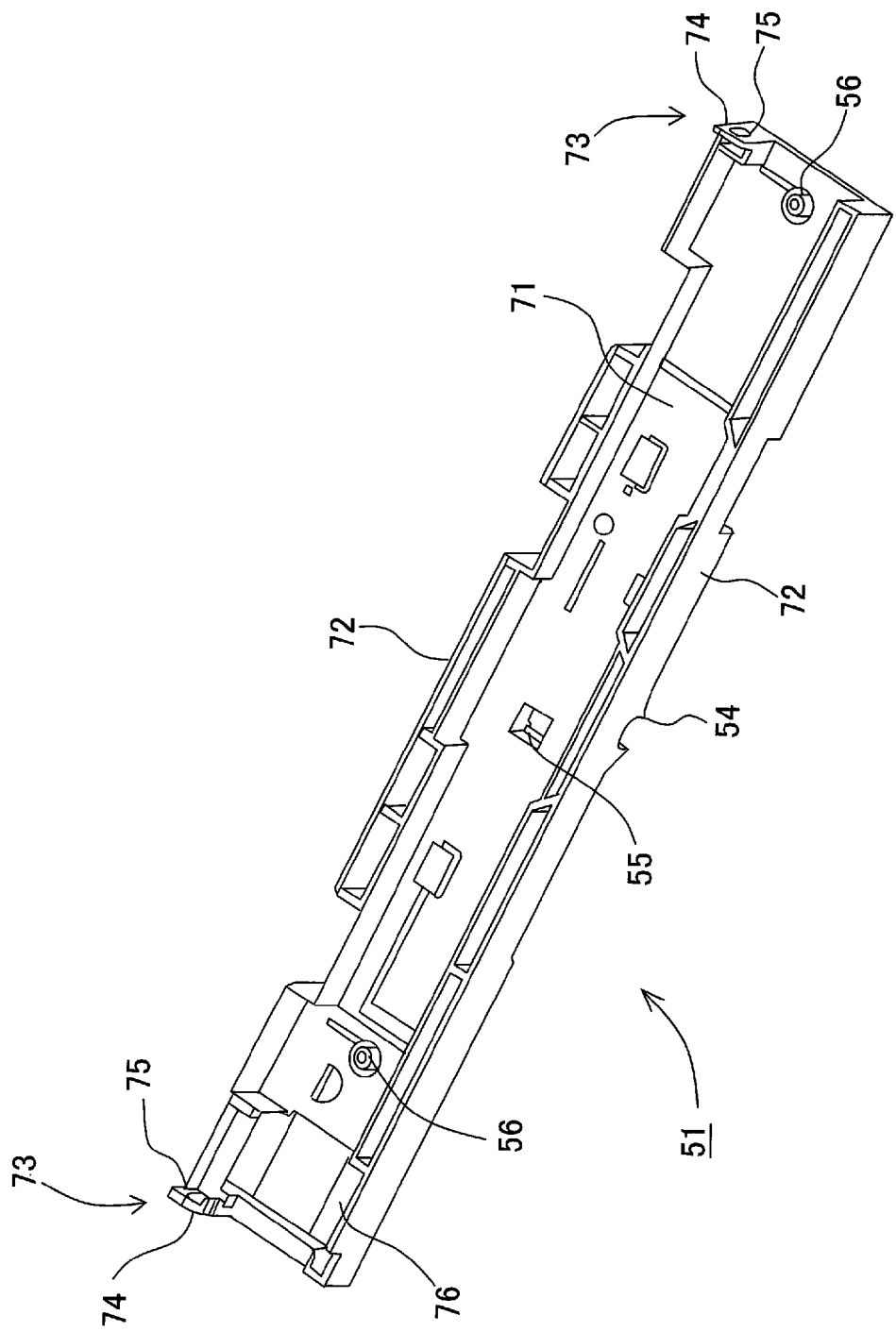
FIG. 6 is a perspective view showing the structure of a carriage 51.
Figure 7:
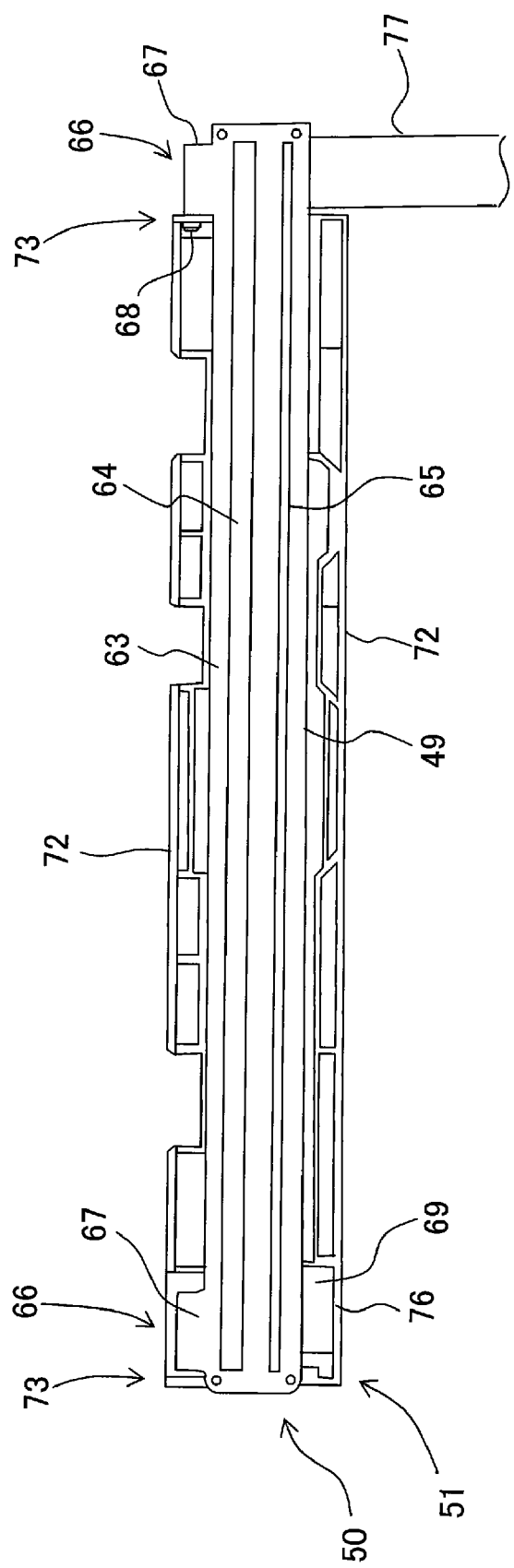
FIG. 7 is a plan view showing a state that the image sensor 50 is mounted on the carriage 51.

As shown in FIG. 6, the carriage 51 is in a container form for mounting the image sensor 50 thereon. The carriage 51 has a bottom portion 71 and walls 72 provided to stand upward from both sides in secondary scanning direction of the bottom portion 71. As shown in FIG. 7, in a space formed by the bottom portion 71 and the walls 72, the image sensor 50 is accommodated. No wall is provided on both sides in the primary scanning direction of the bottom portion 71, and one end of the case 49 of the image sensor 50 projects from a side in the longitudinal direction of the carriage 51.

As shown in FIG. 6, in one of the walls 72, the shaft receiving portions 73 (engaging portion) for engaging with the positioning portions 66 are formed. Each of the shaft receiving portions 73 is formed such that a long hole 75 in a vertical direction is bored in a projecting piece 74 provided on the wall 72 to project upward. As shown in FIG. 7, by inserting the shafts 68 of the positioning portions 66 through the long holes 75, the positioning portions 66 and the shaft receiving portions 73 are engaged. The shaft receiving portions 73 are arranged at positions corresponding to the pair of the positioning portions 66. Therefore, the distance in the longitudinal direction between the pair of the shaft receiving portions 73 corresponds to the distance in the longitudinal direction of the case 49 between the pair of positioning portions 66, namely approximately the double of the distance L1.

As shown in FIG. 6, in the other one of the walls 72, the recess 76 (engaging portion) is formed corresponding to the projecting portion 69. As shown in FIG. 7, by engaging this recess 76 with the projecting portion 69 of the image sensor 50, the image sensor 50 is positioned in the primary scanning direction with respect to the carriage 51.

It should be noted that although in this embodiment the positioning in the secondary scanning direction is made by the positioning portions 66 provided on the case 49 of the image sensor 50 and the positioning in the primary scanning direction is made by the projecting portion 69, the positioning of the image sensor 50 with respect to the carriage 51 by the positioning portions 66 and the projection portion 69 is an example, and hence their shapes, positioning directions and so forth may be changed.

Figure 8:
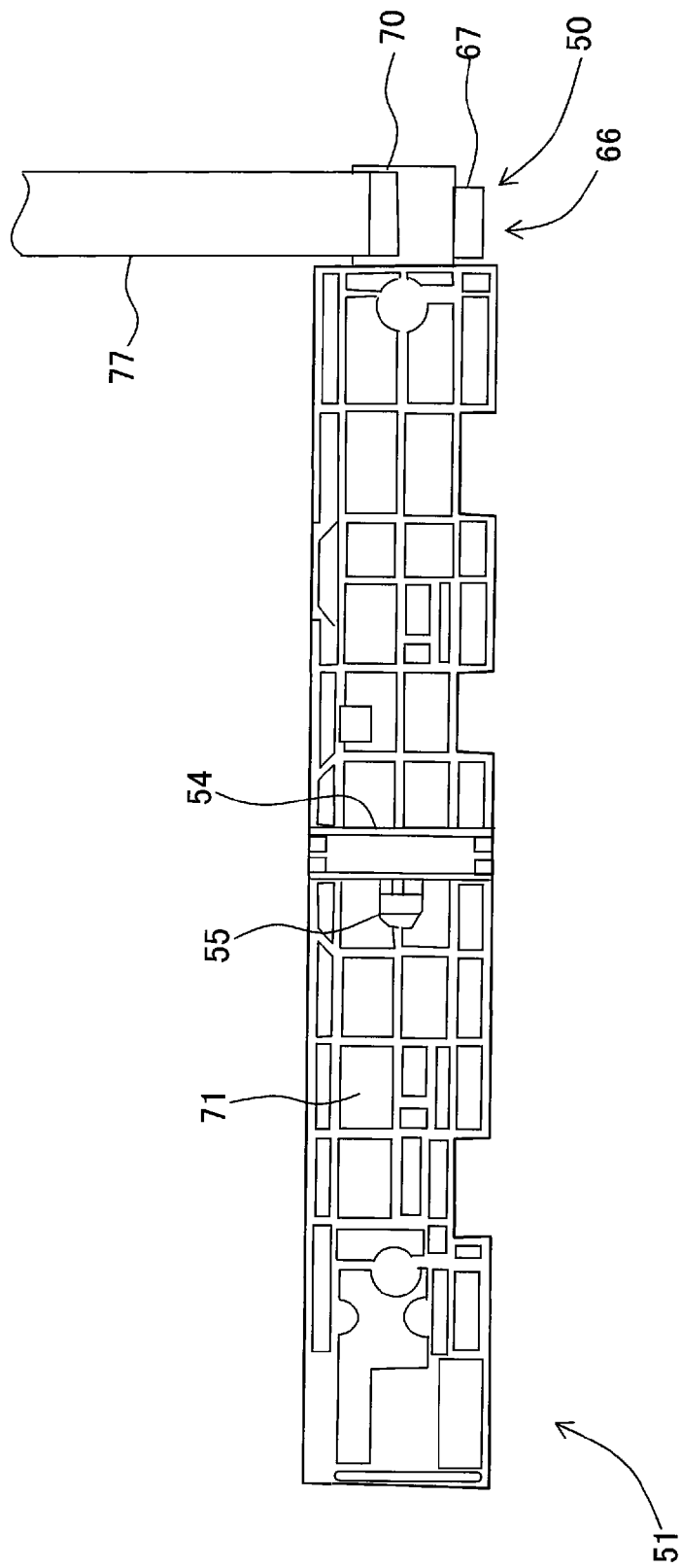
FIG. 8 is a bottom view showing a state that the image sensor 50 is mounted on the carriage 51.

As shown in FIG. 8, the one end in the longitudinal direction of the case 49 of the image sensor 50 accommodated in the carriage 51 projects from the carriage 51. The connector portion 70 is arranged between the one end of the case 49 projecting from the carriage 51 and an end of the carriage 51. In other words, the carriage 51 mounts the image sensor 50 such that the one end of the case 49 on which the connector portion 70 is provided is projected to the outside of the carriage 51.

As shown in the diagram, the electric cable 77 is connected to the connector portion 70. The electric cable 77 is a so-called flat cable in which a plurality of lead wires such as lead wires for supplying power to the LED of the image sensor 50 and lead wires for outputting electrical signals from the photoelectric conversion elements are arranged in a thin flat form and insulated and coated integrally. The electric cable 77 is extended in the secondary scanning direction of the image sensor 50 and the other end thereof is connected to a connector portion provided on an inner surface of the case 20 of the placing-reading table 2, thereby forming an electrical signal path with the control unit connected electrically to the connector portion. Further, the electric cable 77 is flexible and follows the image sensor 50 while changing its posture along with the reciprocating movement of the image sensor 50.

Next, the structure of the image sensor 78 will be described in detail.

The image sensor 78 differs from the image sensor 50 in the length in the longitudinal direction of a case 89. In particular, the image sensor 78 corresponds to a recording-objective medium larger in size than the image sensor 50, such that the image sensor 78 corresponds to the A3 size whereas the image sensor 50 corresponds to the A4 size. Further, the image sensor 78 is mounted also on the carriage 51. That is to say, the carriage 51 is used in common for the image sensors 50 and 78. Note that although in this embodiment the A4 size and the A3 size are shown as the size of an image sensor, the size of an image sensor according to the present invention is not limited thereto, and as a matter of course, image sensors of different sizes may be adapted to be used in common by one carriage.

Figure 9:
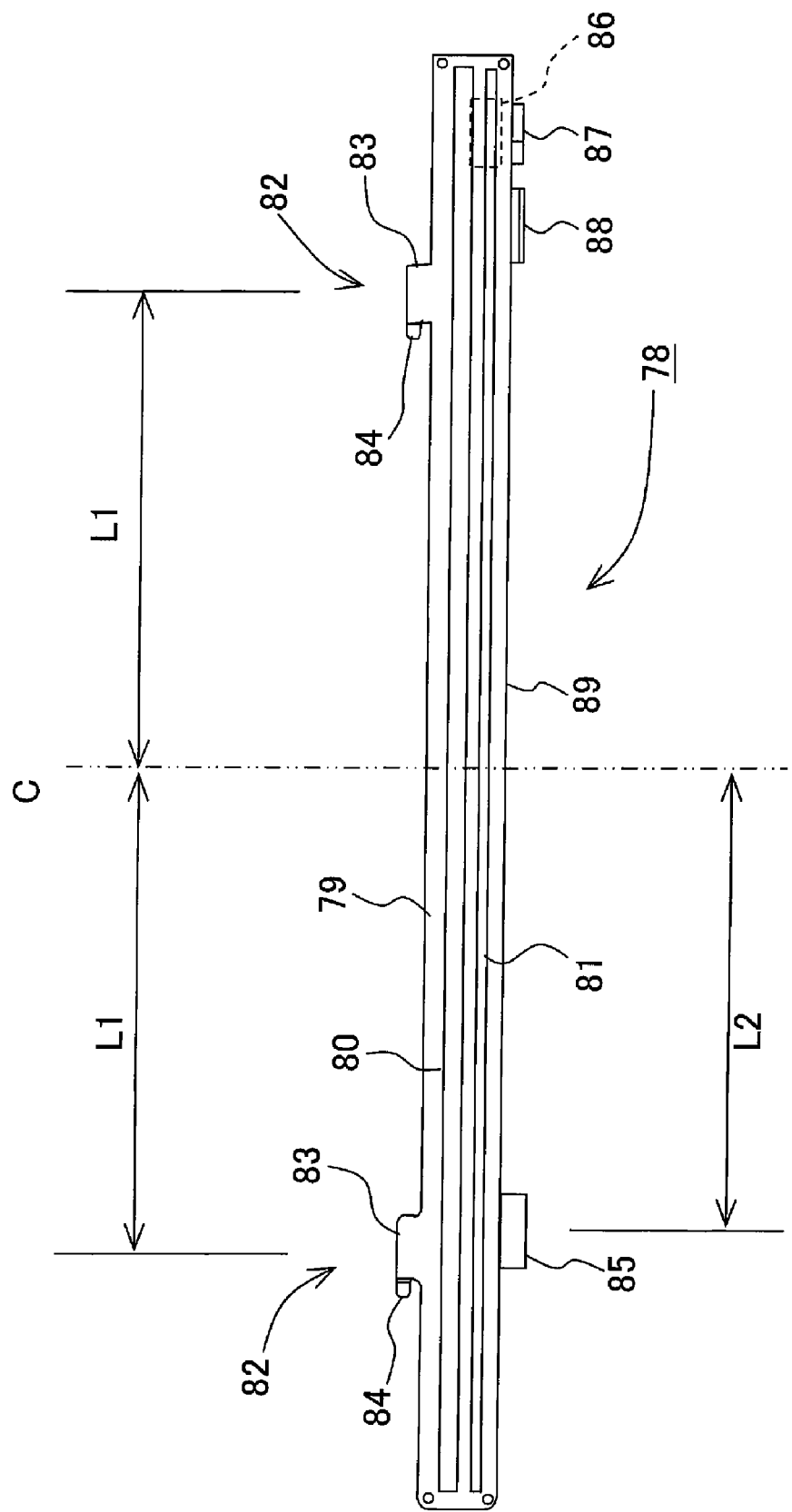
FIG. 9 is a plan view showing the structure of an image sensor 78.

As shown in FIG. 9, the image sensor 78 has the case 89 in a rectangular parallelepiped shape with an upper surface 79 thereof having a slender rectangular shape in a plan view. It is the same as the image sensor 50 in that, on the upper surface 79 of the case 89, a light guide 80 for guiding light from an LED and a lens array 81 constructed of a plurality of condenser lenses are arranged in the longitudinal direction of the case 89. The image sensor 78 projects the light from the LED via the light guide 80 and irradiates the light on a recording-objective medium, collects reflected light therefrom with the condenser lens array 81 to the photoelectric conversion element, and outputs electrical signals according to the intensity of the reflected light. The LED, light guide 80, condenser lens array 81, and photoelectric conversion elements are provided corresponding to the length in the longitudinal direction of the case 89 of the image sensor 78.

The longitudinal direction of the case 89 of the image sensor 78 is the primary scanning direction for reading an image. The length in this primary scanning direction, namely the length in the longitudinal direction of the case 89 of the image sensor 78, is the length corresponding to a recording-objective medium of the maximum size readable by the image sensor 78. The image sensor 78 corresponds to a recording-objective medium of the A3 size, and the image sensor 78 is capable of reading an image of a recording-objective medium up to the A3 size.

In the image sensor 78, positioning portions 82 are provided. The positioning portions 82 are for positioning of the image sensor 78 with respect to the carriage 51 in the secondary scanning direction, namely a direction orthogonal to the primary scanning direction. The positioning portions 82 are formed such that base portions 83 are provided to project from positions each of which is near to an end on one of sides in the short side direction of the case 89 of the image sensor 78, and shafts 84 are provided to project in the longitudinal direction of the case 89 from the base portions 83. The shafts 84 are inserted through long holes 75 of the shaft receiving portions 73 of the carriage 51 to engage the positioning portions 82 with the shaft receiving portions 73, and thus the image sensor 78 is positioned in the secondary scanning direction.

The positioning portions 82 are provided at two positions on one of sides in the short side direction of the case 89 of the image sensor 78. This pair of the positioning portions 82 are arranged at predetermined positions with respect to a reference position C in the longitudinal direction of the case 89, regardless of the length in the longitudinal direction of the case 89 of the image sensor 78. In other words, the positioning portions 82 of this image sensor 78 and the positioning portions 66 of the image sensor 50 are arranged at the same positions with respect to the reference position C in the longitudinal direction of the case 89. As described above, this reference position C is at the center in the longitudinal direction of the case 89. Then, the positioning portions 82 are arranged respectively at positions separated by the distance L1 in the longitudinal direction of the case 89 from the reference position C of the image senor 78.

Further, on the other side in the short direction of the case 89 of the image sensor 78, a projecting portion 85 (positioning portion) is formed. This projecting portion 85 is for positioning of the image sensor 78 in the primary scanning direction by engaging with the recess 76 of the carriage 51. This projecting portion 85 is arranged also at a predetermined position with respect to the reference position C in the longitudinal direction of the case 89, namely a position separated by a distance L2 in the longitudinal direction of the case 89 from the reference position C, regardless of the length in the longitudinal direction of the case 89 of the image sensor 78.

Further, a connector portion 86 is provided on a bottom surface of the case 89 of the image sensor 78 on a side of one end in the longitudinal direction. The connector portion 86 is connected electrically to the LED and the photoelectric conversion elements of the image sensor 78 for performing inputting/outputting of a signal or the like with the control unit. The electric cable 77 is connected to the connector portion 86, and forms an electrical signal path with the control unit of the image reader 1.

Further, on the end of the image sensor 78 where the connector portion 86 is arranged, cable holders 87, 88 are provided. The cable holders 87, 88 are in a hook shape both formed on a side wall of the image sensor 78, by which the electric cable 77 can be locked.

Figure 10:
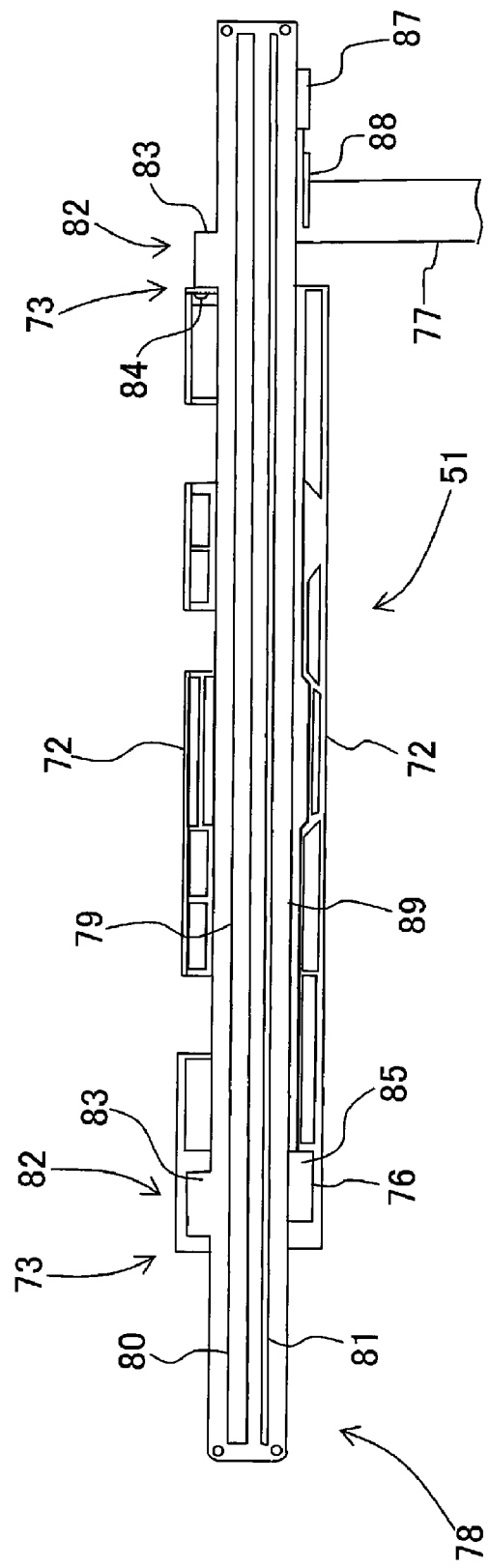
FIG. 10 is a plan view showing a state that the image sensor 78 is mounted on the carriage 51.

As shown in FIG. 10, the image sensor 78 is accommodated in a space formed by the bottom portion 71 and the walls 72 of the carriage 51. No wall is formed on both ends on a side in primary scanning direction of the bottom portion 71, and the image sensor 78 is projected from the sides in the longitudinal direction of the carriage 51. Further, the shafts 84 of the positioning portions 82 of the image sensor are inserted through the long holes 75 of the shaft receiving portions 73 of the carriage 51, thereby engaging the positioning portions 82 with the shaft receiving portions 73. As described above, the distance in the longitudinal direction between the pair of the shaft receiving portions 73 corresponds to approximately the double of the distance L1. Further, since the pair of the positioning portions 82 is at the positions separated respectively by the distance L1 in the longitudinal direction from the reference position C, the positioning portions 82 and the shaft receiving portions 73 are at corresponding positions. Further, by engaging the projecting portion 85 of the image sensor 78 with the recess 76 of the carriage 51, the image sensor 78 is positioned in the primary scanning direction with respect to the carriage 51.

Figure 11:
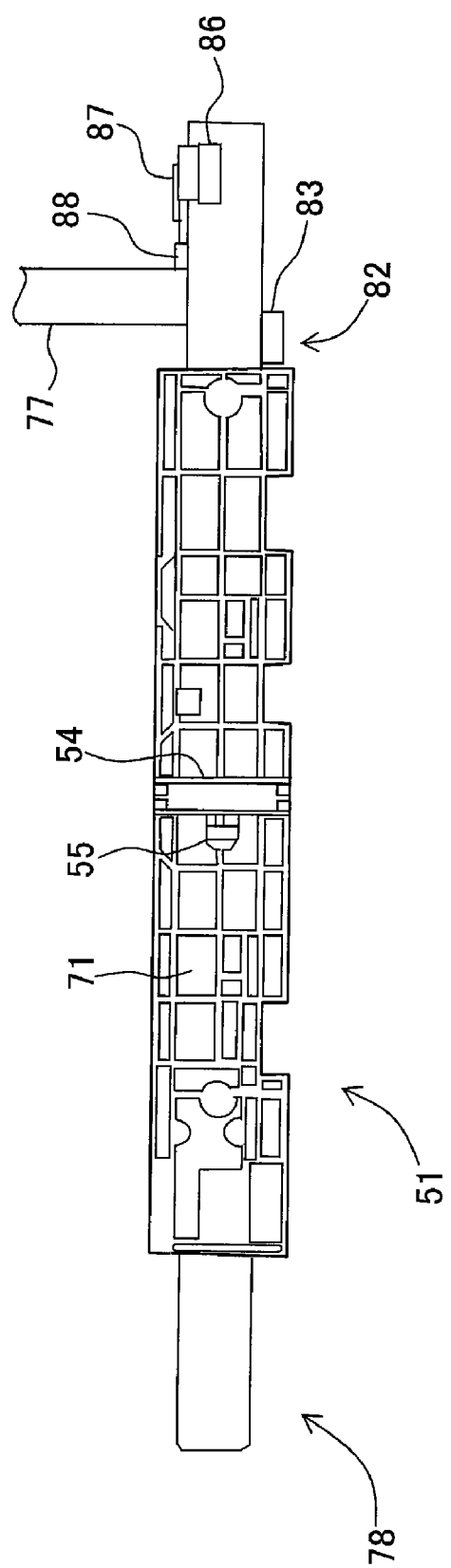
FIG. 11 is a bottom view showing a state that the image sensor 78 is mounted on the carriage 51.

As shown in FIG. 11, both ends in the longitudinal direction of the case 89 of the image sensor 78 accommodated in the carriage 51 project from the carriage 51. The connector portion 86 is arranged between one end of the case 89 projecting from the carriage 51 and an end of the carriage 51. In other words, the carriage 51 mounts the image sensor 78 such that the one end of the case 89 of the image sensor 78, in which the connector portion 86 is provided, is projected to the outside of the carriage 51.

As shown in the diagram, the electric cable 77 is connected to the connector portion 86. This electric cable 77 is extended in the secondary scanning direction of the image sensor 78 and the other end of the electric cable 77 is connected to the connector portion provided in the inner surface of the case 20 of the placing-reading table 2, thereby forming an electrical signal path with the control unit connected electrically to the connector portion. Further, the electric cable 77 is flexible and follows the image sensor 78 while changing its posture along with the reciprocating movement of the image sensor 78.

Figure 12:
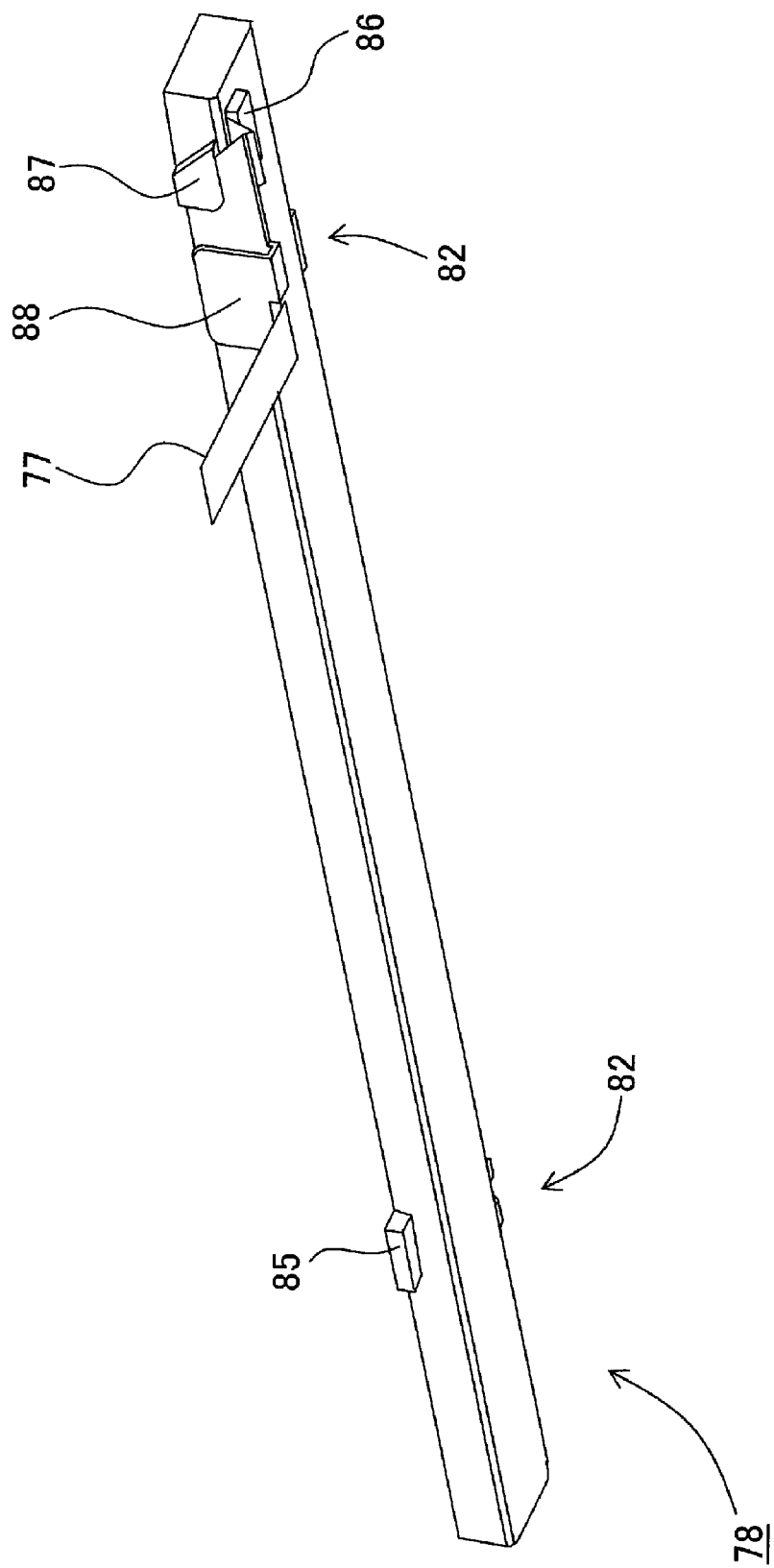
FIG. 12 is a perspective view showing the image sensor 78 to which an electric cable 77 is connected.
Figure 13:
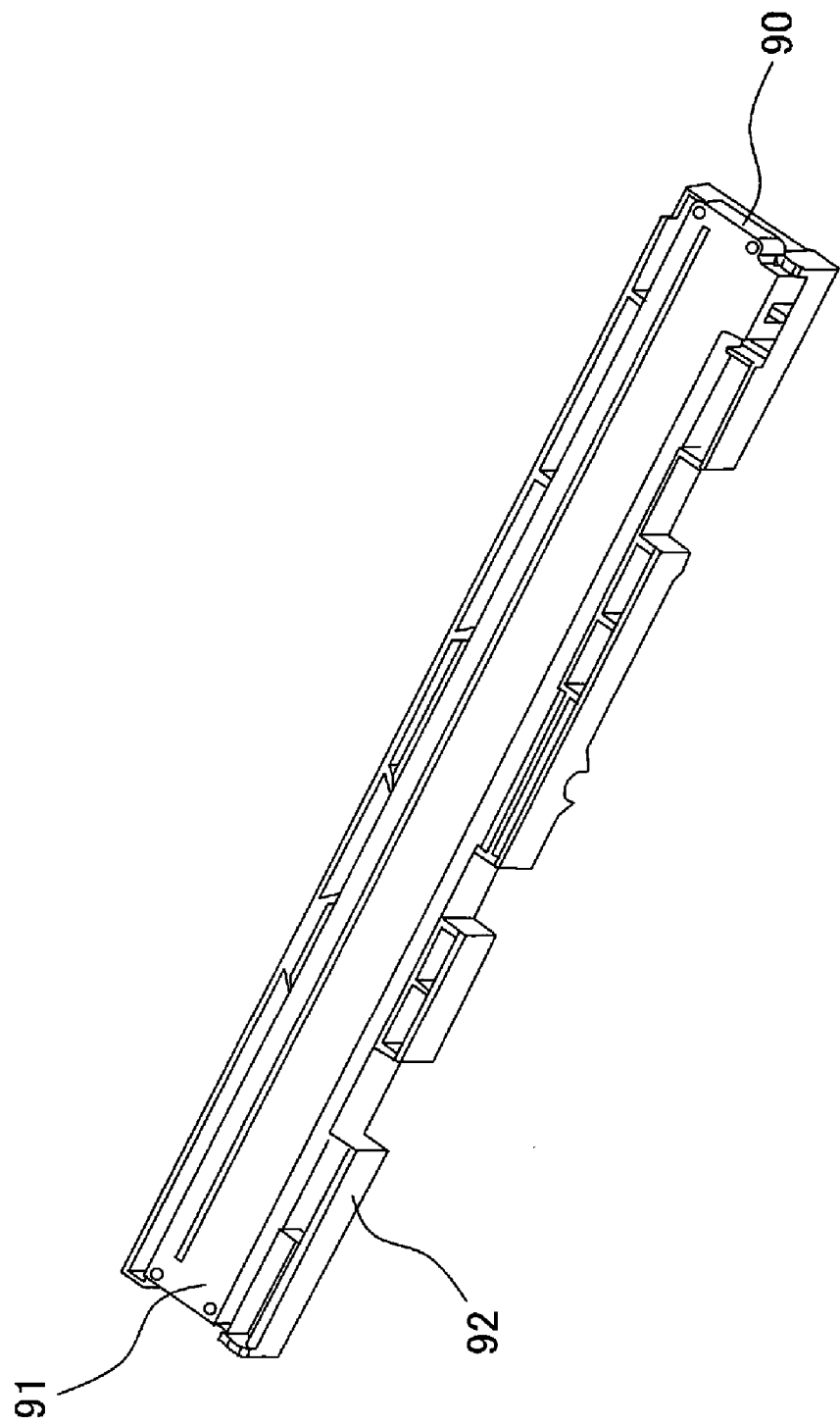
FIG. 13 is a perspective view showing a conventional image sensor 90 and carriage 92.

As shown in FIG. 11 and FIG. 12, the electric cable 77 is locked by the cable holders 87, 88 at a predetermined position separated or away from the connector portion 86 of the image sensor 78. By locking with the cable holders 87, 88, the electric cable 77 is restrained from moving in a longitudinal direction thereof. Note that although in this embodiment the electric cable 77 is locked by the two cable holders 87, 88, a cable holder may be formed at one position. Further, the cable holders are preferably in a hook shape for the simplicity of an operation of locking the electric cable 77, but as long as the cable holder is capable of restraining the movement in the longitudinal direction of the electric cable 77, the shape of the cable holders are not limited particularly.

As has been described, for the image sensor 50 corresponding to the A4 size and the image sensor 78 corresponding to the A3 size, by arranging the positioning portions 66, 82 for positioning in the secondary scanning direction with respect to the carriage 51 at the positions each separated by the distance L1 in the longitudinal direction of the cases 49, 89 from the reference positions C of the image sensors 50, 78 respectively, and by arranging the projecting portions 69, 85 for positioning in the primary scanning direction with respect to the carriage 51 at the position separated by the distance L2 in the longitudinal direction of the cases 49, 89 from the reference positions C respectively, each of the positioning portions 66, 82 and the projecting portions 69, 85 is at predetermined position with respect to the reference positions C in the primary scanning direction of the image sensors 50, 78 either when the recording-objective medium of the maximum readable size is the A4 size or when it is the A3 size. In other words, the positioning portions 66, 82 and the projecting portions 69, 85 are at common positions for the image sensors 50, 78, respectively.

Further, in the carriage 51, the shaft receiving portions 73 are formed corresponding to the positioning portions 66, 82, and the recess 76 is formed corresponding to the projecting portions 69, 85, so that the carriage 51 is made common to the image sensors 50, 78. Thus, by making the carriage 51 common to the image sensors 50, 78 of a plurality of types which differ in the longitudinal directions of the cases 49, 89, it is possible to decrease the costs of image readers corresponding to the A4 and the A3 respectively.

Furthermore, regarding the respective image sensors 50, 78 mounted on the carriage 51, since the one ends in the longitudinal direction of the cases 49, 89 at which the connector portions 70, 86 are provided, respectively are projected to the outside of the carriage 51, the connector portions 70, 86 are located outside the carriage 51 respectively. Namely, the connector portions 70, 86 are not covered by the carriage 51. Accordingly, when connecting the electric cable 77 to the connector portions 70, 86, there is no need to remove the image sensors 50, 78 from the carriage 51. In other words, in a state that the image sensors 50, 78 are mounted on the carriage 51, the electric cable 77 can be connected to the connector portions 70, 86. Further, it is possible that after the electric cable 77 is connected to the connector portions 70, 86 of the image sensors 50, 78, the image sensors 50, 78 can be mounted on the carriage 51. Accordingly, an operation of connecting the electric cable 77 becomes simple, and a possibility of contacting the upper surfaces 63, 79 of the image sensors 50, 78 while working is decreased. Further, the carriage 51 is reduced in size, and thus the costs of the carriage 51 can be decreased.

Moreover, by providing the cable holders 87, 88 on the image sensor 78 and by locking the electric cable 77 by the cable holders 87, 88, a position in the primary scanning direction for the electric cable 77 to be extended from the image sensor 78 can be set at a desired position, regardless of the position of the connector portion 86. Further, since the cable holders 87, 88 restrain the movement in the longitudinal direction of the electric cable 77, the electric cable is held loosely between the connected portion 86 and the cable holders 87, 88, thereby preventing transmission of load via the electric cable 77 to the connecting position of the connector portion 86 and the electric cable 77. Accordingly, even when the electric cable 77 changes in posture along with the reciprocating movement of the carriage 51, excessive load will not be generated at the connecting position of the connector portion 86 and the electric cable 77.

Second Embodiment

Figure 14:
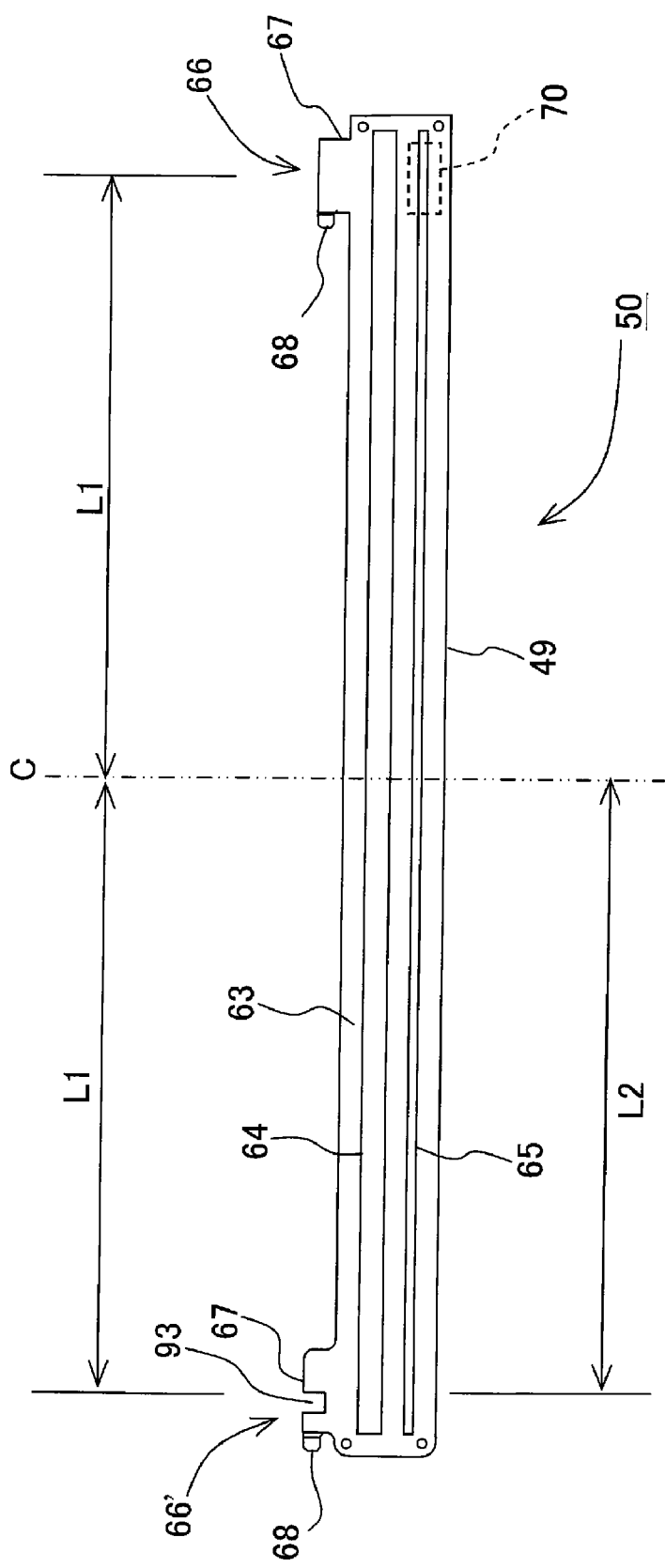
FIG. 14 is a plan view showing the structure of an image sensor 50 in a second embodiment of the present invention.

A second embodiment for carrying out the present invention will be described using FIG. 14 and FIG. 15 mainly about differences from the first embodiment.

The longitudinal direction of a case 49 of an image sensor 50 is the primary scanning direction for reading an image. The length in the primary scanning direction, namely the length in the longitudinal direction of the case 49 of the image sensor 50 is the length corresponding to a recording-objective medium of the maximum size readable by the image sensor 50. The image sensor 50 has a length corresponding to a recording-objective medium of A4 size.

In the case 49 of the image sensor 50, positioning portions 66 are provided. First and second positioning portions 66, 66' are for positioning, with respect to the carriage 51, in the secondary scanning direction of the image sensor 50, namely a direction orthogonal to the primary scanning direction. To describe in detail, the first and second positioning portions 66, 66' are formed such that base portions 67 are provided to project from ends on one of sides in the short direction of the case 49 of the image sensor 50, and shafts 68 are provided to project in the longitudinal direction from the base portions 67 respectively. The shafts 68 engage with shaft receiving portions 73, which will be described later, of the carriage 51, and thus the image sensor 50 is positioned in the secondary scanning direction.

The first and second positioning portions 66, 66' are each provided at an end on a side in the short direction of the case 49 of the image sensor 50. This pair of the positioning portions 66, 66' are arranged at predetermined positions with respect to a reference position C in the longitudinal direction of the case 49, regardless of the length in the longitudinal direction of the case 49 of the image sensor 50. In other words, in either case of the image sensor 50 corresponding to the A4 size or an image sensor 78 which corresponds to A3 size and which will be described later, the positioning portions 66, 66' are arranged at the same positions with respect to the reference position C in the longitudinal direction of the case 49. This reference position C is at the center in the longitudinal direction of the case 49. As shown in the diagram, the positioning portions 66, 66' are arranged in the vicinities of both ends, respectively, in the longitudinal direction of the case 49, at each of which a distance L1 separated in the longitudinal direction from the reference position C for the positioning portions 66, 66' is constant regardless of the length in the longitudinal direction of the case 49. Note that although in this embodiment the respective distances L1 from the reference position C for the respective positioning portions 66, 66' are equal, the respective distances L1 for the pair of the positioning portions 66, 66' need not be equal as long as the distances from the reference position C are constant.

Further, in the second positioning portion 66', a recess 93 is formed. This recess 93 is for positioning in the primary scanning direction of the image sensor 50 by engaging with a projecting portion 77 of the carriage 51 which will be described later. This recess 93 is also arranged at a predetermined position with respect to the reference position C in the longitudinal direction of the case 49, namely a position separated by the distance L2 in the longitudinal direction of the case 49 from the reference position C regardless of the length in the longitudinal direction of the case 49 of the image sensor 50.

Figure 15:
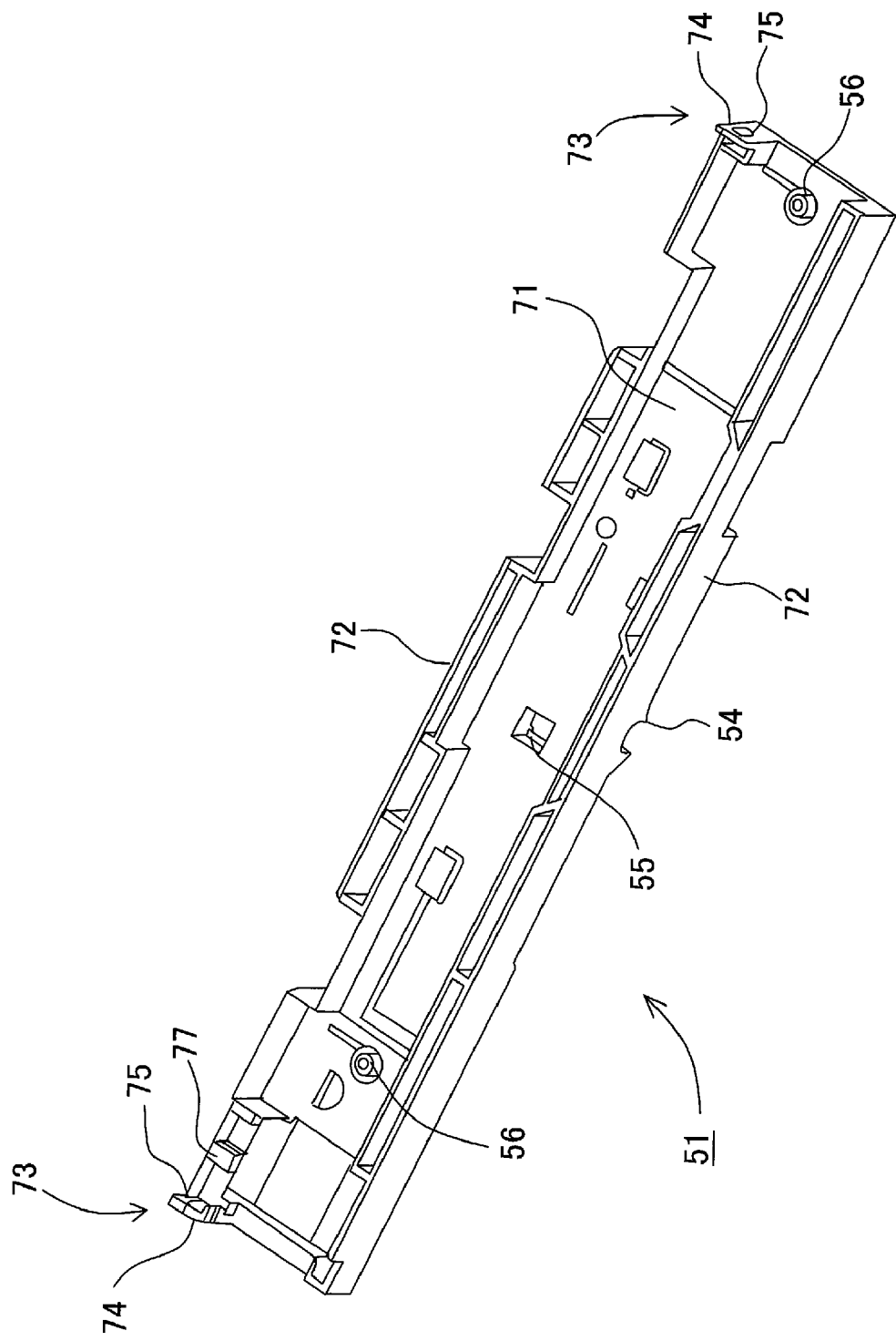
FIG. 15 is a perspective view showing the structure of a carriage 51 in the second embodiment of the present invention.

As shown in FIG. 15, the carriage 51 is in a container form for mounting the image sensor 50 thereon. The carriage 51 has a bottom portion 71 and walls 72 provided to stand upward from both sides in secondary scanning direction of the bottom portion 71. In a space formed by the bottom portion 71 and the walls 72, the image sensor 50 is accommodated. No wall is provided on both sides in the primary scanning direction of the bottom portion 71, and one end of the case 49 of the image sensor 50 projects from a side in the longitudinal direction of the carriage 51.

As shown in FIG. 15, on one of the walls 72, the shaft receiving portions 73 (engaging portion) for engaging with the first and second positioning portions 66, 66' are formed. Each of the shaft receiving portions 73 is formed such that a long hole 75 in a vertical direction is bored in a projecting piece 74 provided on the wall 72 to project upward. By inserting the shafts 68 of the positioning portions 66, 66' through the long holes 75, the positioning portions 66, 66' and the shaft receiving portions 73 are engaged. The shaft receiving portions 73 are arranged at positions corresponding to the pair of the positioning portions 66, 66'. Therefore, the distance in the longitudinal direction between the pair of the shaft receiving portions 73 corresponds to the distance in the longitudinal direction of the case 49 between the positioning portions 66, 66', namely approximately the double of the distance L1.

As shown in FIG. 15, on a side of the wall 72 at which one of the shaft receiving portions 73 is formed, the projecting portion 77 (engaging portion) is formed corresponding to the recess 93 of the second positioning portion 66'. In a state that the shafts 68 of the positioning portions 66 are inserted into the holes 75 of the shaft receiving portions 73, the case 49 of the image sensor 50 is pivoted with respect to the carriage 51 so that the recess 93 engages with the projecting portion 77, and thus the positioning in the primary scanning direction is made.

It should be noted that although in this embodiment the positioning in the secondary scanning direction is made by the positioning portions 66, 66' provided on the case 49 of the image sensor 50 and the positioning in the primary scanning direction is made by the recess 93, the positioning of the image sensor 50 with respect to the carriage 51 by the positioning portions 66, 66' and the recess 93 is an example, and hence their shapes, positioning directions and so forth may be changed.

Method of Producing the Image Reader

Figure 16:
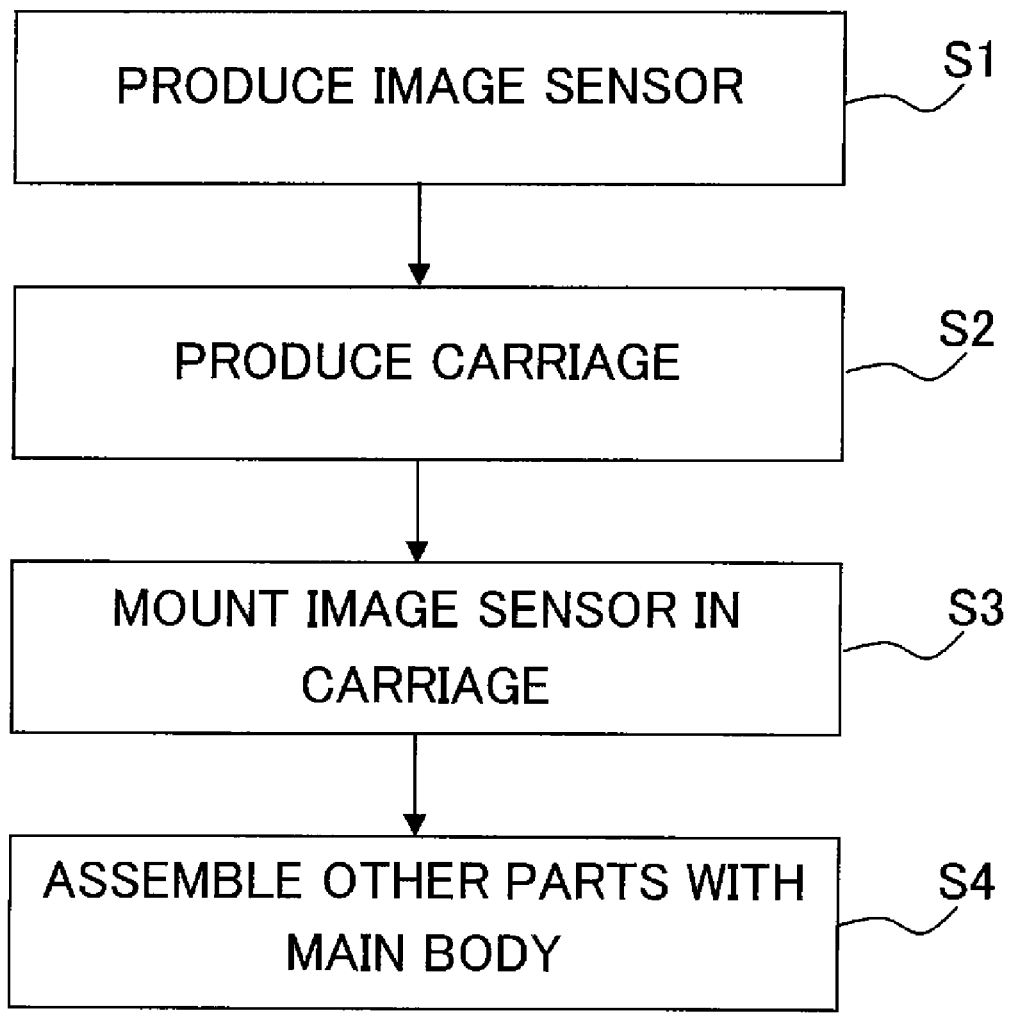
FIG. 16 is a flow chart schematically showing a procedure of a method of producing an image reader according to the present invention.

A method of producing the above-described image reader according to the present invention will be described briefly using FIG. 16.

First, there is produced an image sensor having an engaging portion formed at a predetermined position in a longitudinal direction from a reference position of the image sensor (S1), regardless of the length of the image sensor.

Second, there is produced a carriage which is common to image sensors with various lengths and which has an engage-objective portion to be engaged with the engaging portion (S2).

Third, the engaging portion of the image sensor is engaged with the engage-objective portion of the carriage to thereby mount the image sensor in the carriage (S3).

Fourth, the image sensor mounted in the carriage and other parts are assembled with a body of an image reader, thereby completing the image reader as shown in FIG. 1 and FIG. 2 (S4).

It should be noted that, in the above-described embodiments, although the cable holders 87, 88 are provided only to the image sensor 78 corresponding to the A3 size, it is needless to mention that similar cable holders can be provided to the image sensor 50 corresponding to the A4 size to obtain the same effect.

In the above-described embodiments, an example of each of the image sensors 50, 78 is shown, but an image sensor having a different structure may be used within the scope of the present invention.

What is claimed is:

1. An image reader, comprising:
a carriage comprising an engaging portion;
an image sensor case disposed on the carriage and comprising a positioning portion;
an image sensor, having an elongated shape, and disposed in the image sensor case; and
a connector portion to which an electric cable is connected, and which is provided between one end in a longitudinal direction of the image sensor and an end of the carriage;
wherein the positioning portion of the image sensor case is engaged with the engaging portion of the carriage and the positioning portion of the image sensor case is formed at a predetermined position in the longitudinal direction of the image sensor with respect to a reference position.

2. The image reader according to claim 1, wherein the image sensor is mounted on the carriage such that the one end to which the connector portion is provided is projected to outside of the carriage.

3. The image reader according to claim 1, wherein the connector portion is provided in a bottom surface of the image sensor.

4. The image reader according to claim 1, wherein the image sensor has a cable holder which holds the electric cable at a predetermined position separated from the connector portion.

5. The image reader according to claim 4, wherein the cable holder restrains movement of the electric cable in a longitudinal direction of the electric cable.

6. The image reader according to claim 1, wherein the reference position is a center in the longitudinal direction of the image sensor.

7. The image reader according to claim 1, wherein the positioning portion includes first and second positioning portions, and the first positioning portion engages with the carriage in an inner surface of the carriage and the second positioning portion engages with the carriage in an outer surface of the carriage.

8. The image reader according to claim 1, wherein the engaging portion includes first and second engaging portions, and the first engaging portion is formed in an inner surface of the carriage and the second engaging portion is formed in an outer surface of the carriage.

9. An image reader, comprising:
a carriage;
an image sensor case disposed on the carriage and comprising a positioning portion; and
an image sensor, disposed in the image sensor case;
wherein:
the carriage is used in common for the image sensor and another image sensor having a size different from that of the image sensor; and
the positioning portion of the image sensor case is configured to engage with the carriage and the positioning portion of the image sensor case is disposed at a position that is the same for the image sensor and the another image sensor.

10. The image reader according to claim 9, wherein the image sensor and the another image sensor have a common reference position, and the position of the positioning portion is determined with respect to the reference position.

11. The image reader according to claim 10, wherein the reference position is a center in a longitudinal direction of the image sensor, and the position of the positioning portion is a position separated from the reference position by a predetermined distance in the longitudinal direction of the image sensor.

12. The image reader according to claim 9, wherein a connector portion to which an electric cable is connected is provided between an end of the carriage and one end in a longitudinal direction of each of the image sensor and the another image sensor having the size different from that of the image sensor.

13. The image reader according to claim 9, wherein an engaging portion which is engaged with the positioning portion is formed in the carriage.

14. The image reader according to claim 13, wherein the engaging portion includes first and second engaging portions, and the first engaging portion is formed in an inner surface of the carriage and the second engaging portion is formed in an outer surface of the carriage.

15. The image reader according to claim 9, wherein the positioning portion includes first and second positioning portions, and the first positioning portion engages with the carriage in an inner surface of the carriage and the second positioning portion engages with the carriage in an outer surface of the carriage.

* * * * *